US012518713B2

(12) United States Patent
Shih et al.

(10) Patent No.: US 12,518,713 B2
(45) Date of Patent: Jan. 6, 2026

(54) BACKLIGHT CONTROL CIRCUIT AND DRIVING METHOD THEREOF

(71) Applicant: AUO Corporation, Hsinchu (TW)

(72) Inventors: Kai-Teng Shih, Hsinchu (TW); Chun-Yu Huang, Hsinchu (TW)

(73) Assignee: AUO CORPORATION, Hsinchu (TW)

( * ) Notice: Subject to any disclaimer, the term of this patent is extended or adjusted under 35 U.S.C. 154(b) by 0 days.

(21) Appl. No.: 18/895,425

(22) Filed: Sep. 25, 2024

(65) Prior Publication Data

US 2025/0201203 A1 Jun. 19, 2025

(30) Foreign Application Priority Data

Dec. 13, 2023 (TW) ................................ 112148551

(51) Int. Cl.
*G09G 3/34* (2006.01)

(52) U.S. Cl.
CPC ..... *G09G 3/342* (2013.01); *G09G 2320/0646* (2013.01)

(58) Field of Classification Search
CPC ........... G09G 3/342; G09G 2320/0646; G09G 3/3426; H05B 45/46; H05B 45/50; H05B 45/52; H05B 45/00
See application file for complete search history.

(56) References Cited

U.S. PATENT DOCUMENTS 8,081,199 B2 * 12/2011 Takata .................. G09G 3/342 345/82
2010/0283322 A1 * 11/2010 Wibben ................ H02M 3/158 307/31
2011/0175547 A1 * 7/2011 Oh ......................... H05B 45/46 315/294
2011/0227503 A1 * 9/2011 Yuan .................... G09G 3/3406 315/294
2019/0159311 A1 * 5/2019 Zhang .................... H05B 45/37
2020/0113023 A1 * 4/2020 Yu ......................... H05B 45/46
2020/0380923 A1 12/2020 Sun et al.

FOREIGN PATENT DOCUMENTS

CN 106228934 A 12/2016
CN 109243379 A 1/2019

* cited by examiner

*Primary Examiner* — Rodney Amadiz
(74) *Attorney, Agent, or Firm* — WPAT, PC

(57) ABSTRACT

A backlight control circuit includes LED circuits, a LED driver circuit, first switches and a switch module circuit. Each LED circuit includes a first and a second terminal. The second terminals of the LED circuits are connected. The LED driver circuit provides driving signals and dimming signal in sequence and provides error detection signals when the LED circuit is shorted or opened. The first switches are connected to the first terminals of the LED circuits for switching on or off the LED circuits based on the error detection signals. The switch module circuit includes second switches and third switches for timing provision of dimming signal. When a short or open circuit occurs, the error detection signal turns off corresponding first switch and third switch, so that the first terminal of the shorted/opened LED circuit is floating, and the second terminals can receive the dimming signal in other timing periods.

20 Claims, 7 Drawing Sheets

100

BACKLIGHT CONTROL CIRCUIT AND DRIVING METHOD THEREOF

RELATED APPLICATIONS

This application claims priority to Taiwan Application Serial Number 112148551, filed Dec. 13, 2023, which is herein incorporated by reference.

BACKGROUND

Technical Field

The present disclosure relates to a backlight control circuit and a driving method thereof, and more particularly to a backlight control circuit with a short-circuit and open-circuit detection mechanism and a driving method thereof.

Description of Related Art

Scanning driver chips, which are conventionally used to drive a light emitting diode (LED) display, usually include a row driver circuit and a column driver circuit. The row driver circuit provides control signals to each row of the LED display at different times, so that the column driver circuit can provide dimming data to the LEDs in each column in sequence and make the LEDs produce corresponding brightness according to the dimming data. For example, when the row driver circuit scans a certain row, the column driver circuit provides corresponding dimming data to all the columns corresponding to this row, so that the LEDs in all the columns corresponding to this row display the required brightness according to the dimming data.

In LED displays, one type of LED connection is the common cathode connection. In this connection manner, the anodes of the same column of LEDs are connected to different time-division driving signals, and the cathodes of the same column of LEDs are electrically connected to each other. Therefore, when a certain column of LEDs sequentially receive the time-division driving signals, these LEDs can receive the dimming data one by one in accordance with the time-division driving signals, thus displaying the required brightness. However, in the application of common cathode connection, when an LED in a certain region of a certain column is shorted or opened, because the cathodes are connected to each other, the light emitting behavior of other LEDs in the same column may be affected, thus failing to receive the correct dimming signals.

SUMMARY

Therefore, the present disclosure provides a backlight control circuit, which includes: a plurality of LED circuits, an LED driver circuit, a plurality of first switches, and a switch module circuit. The LED circuits are corresponding to a plurality of dimming zones in a one-to-one manner, each of the LED circuits includes a first terminal and a second terminal and the second terminals of the LED circuits are electrically connected to each other. The LED driver circuit is used to provide a driving signal and a corresponding dimming signal to each LED circuit according to timing, where when one of the LED circuits is shorted or opened, the LED driver circuit is further used to provide a corresponding error detection signal to each of the LED circuits. The first switches are electrically connected to the LED circuits and the LED driver circuit, where the first switches are separately electrically connected to the first terminals of the LED circuits, so as to switch on or off the LED circuits according to the error detection signal corresponding to each LED circuit. The switch module circuit is electrically connected to the LED driver circuit and the second terminal of each LED circuit, so as to provide the corresponding dimming signal to each LED circuit. The switch module circuit includes a plurality of second switches and a plurality of third switches. The second switches are separately used to receive the driving signal corresponding to each LED circuit, for independent provision of the dimming signals at different times. The third switches, separately connected in series with a corresponding one of the second switches and used to receive the error detection signal corresponding to each LED circuit. When one of the LED circuits is shorted or opened, the error detection signal turns off the corresponding one of the first switches and the corresponding one of the third switches, so that the first terminal of the shorted or opened LED circuit has a floating voltage, the second terminal of the shorted or opened LED circuit is unable to receive the corresponding dimming signal, and other LED circuits with mutually connected second terminals receive the corresponding dimming signal.

According to an embodiment of the present disclosure, each of the LED circuits includes at least one LED.

According to an embodiment of the present disclosure, the first terminal of each LED circuit is an anode terminal of the at least one LED.

According to an embodiment of the present disclosure, the second terminal of each LED circuit is a cathode terminal of the at least one LED.

According to an embodiment of the present disclosure, the number of the second switches in the switch module circuit are equal to the number of the LED circuits.

According to an embodiment of the present disclosure, the number of the third switches in the switch module circuit are equal to the number of the LED circuits.

According to an embodiment of the present disclosure, when none of the LED circuits is shorted or opened, the first switches and the third switches corresponding to each of the LED circuits are normally turned on.

According to an embodiment of the present disclosure, each of the first switches comprises a control terminal, a first terminal and a second terminal, the control terminal is configured to receive the corresponding error detection signal, the first terminal is electrically connected to the LED driver circuit, the second terminal is electrically connected to the first terminal of corresponding one of the LED circuits.

According to an embodiment of the present disclosure, each of the second switches comprises a control terminal, a first terminal and a second terminal, the control terminal is configured to receive the driving signal, the first terminal is electrically connected to corresponding one of the third switches, the second terminal is electrically connected to the second terminal of the LED circuits.

According to an embodiment of the present disclosure, each of the third switches comprises a control terminal, a first terminal and a second terminal, the control terminal is configured to receive the corresponding error detection signal, the first terminal is configured to receive the corresponding dimming signal, the second terminal is electrically connected to the first terminal of corresponding one of the second switches.

The present disclosure further provides a driving method of a backlight control circuit, which includes: providing a driving signal to a first switch corresponding to each LED circuit according to timing; providing, by the second switches of the switch module circuit, a corresponding dimming signal to a second terminal of each LED circuit; when at least one of the LED circuits is shorted or opened, performing the following steps: generating an error detection signal corresponding to the at least one of the LED circuits; and turning off the first switch corresponding to the at least one of the LED circuits and turning off a third switch corresponding to the at least one of the LED circuits in the switch module circuit according to the error detection signal; where after the first switch and the third switch corresponding to the at least one of the LED circuits are turned off, the first terminal of the at least one LED circuit has a floating voltage, the second terminal of the at least one of the LED circuits cannot receive the corresponding dimming signal, and other LED circuits with the mutually connected second terminals can receive the corresponding dimming signal.

According to an embodiment of the present disclosure, each of the LED circuits includes at least one LED.

According to an embodiment of the present disclosure, the first terminal of each LED circuit is an anode terminal of the at least one LED.

According to an embodiment of the present disclosure, the second terminal of each LED circuit is a cathode terminal of the at least one LED.

According to an embodiment of the present disclosure, the method further includes: when the LED circuits are normally sequentially driven, performing the following steps: turning on the first switch corresponding to each of the LED circuits, so that the driving signal is provided to the first terminal of each LED circuit according to timing; turning on a third switch corresponding to each of the LED circuits in the switch module circuit; and turning on a second switch corresponding to each of the LED circuits in the switch module circuit according to the timing, so that the corresponding dimming signals are provided to the mutually electrically connected second terminal of each of the LED circuits.

According to an embodiment of the present disclosure, the number of the second switches in the switch module circuit are equal to the number of the LED circuits.

According to an embodiment of the present disclosure, the number of the third switches in the switch module circuit are equal to the number of the LED circuits.

According to an embodiment of the present disclosure, each of the first switches comprises a control terminal, a first terminal and a second terminal, the control terminal is configured to receive the corresponding error detection signal, the first terminal is electrically connected to the LED driver circuit, the second terminal is electrically connected to the first terminal of corresponding one of the LED circuits.

According to an embodiment of the present disclosure, each of the second switches comprises a control terminal, a first terminal and a second terminal, the control terminal is configured to receive the driving signal, the first terminal is electrically connected to corresponding one of the third switches, the second terminal is electrically connected to the second terminal of the LED circuits.

According to an embodiment of the present disclosure, each of the third switches comprises a control terminal, a first terminal and a second terminal, the control terminal is configured to receive the corresponding error detection signal, the first terminal is configured to receive the corresponding dimming signal, the second terminal is electrically connected to the first terminal of corresponding one of the second switches.

BRIEF DESCRIPTION OF THE DRAWINGS

In order to make the foregoing and other objects, features, advantages and embodiments of the present disclosure more readily understandable, the accompanying drawings are described as follows.

DETAILED DESCRIPTION

The following disclosure provides many different embodiments or examples for implementing different features of the provided disclosure. The embodiments of the components and configurations described below are merely illustrative and are not intended to be limitative. In addition, for purposes of simplicity and clarity, this disclosure repeats the reference symbols and/or numbers in the examples, and does not limit the relationships between the discussed various embodiments and/or components.

Figure 1:
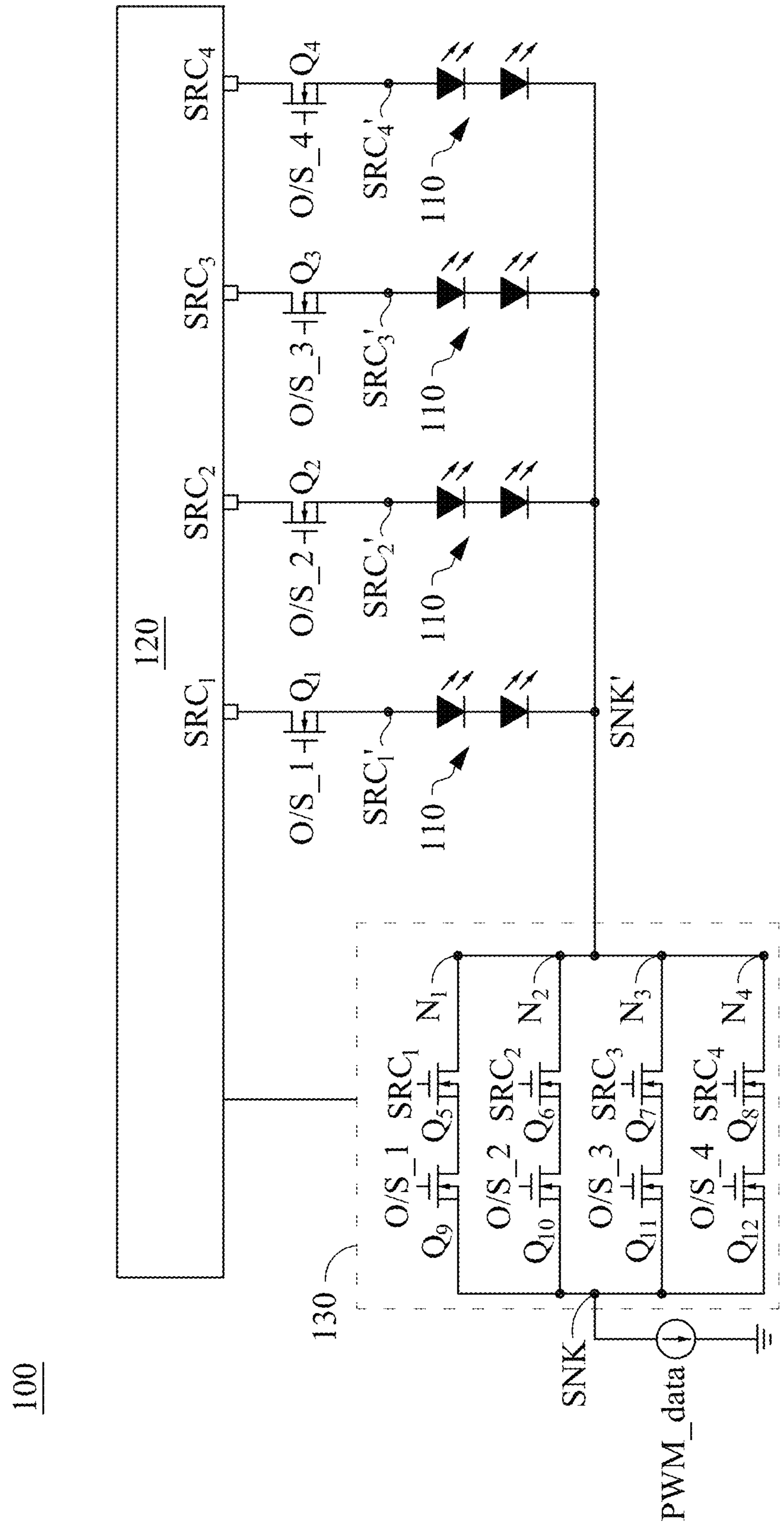
FIG. 1 is a schematic diagram of a backlight control circuit according to an embodiment of the present disclosure.

Referring to FIG. 1, FIG. 1 is a schematic diagram of a backlight control circuit 100 according to an embodiment of the present disclosure. The backlight control circuit 100 includes a plurality of LED circuits 110, an LED driver circuit 120, first switches $Q_1$~$Q_4$, and a switch module circuit 130. Each of the LED circuits 110 can be used independently as a dimming zone and display different brightness according to received dimming signal PWM_data. First terminals of the LED circuits 110 are $SRC_1'$ to $SRC_4'$ respectively, and their second terminals SNK' are electrically connected to each other. The LED driver circuit 120 is used to provide driving signals $SRC_1$~$SRC_4$ and a corresponding dimming signal PWM_data to each of the LED circuits 110 according to timing.

When one of the LED circuits 110 is shorted or opened, the LED driver circuit 120 is further used to provide corresponding error detection signals O/S_1~O/S_4 to the LED circuits 110 respectively. The first switches $Q_1$~$Q_4$ are separately electrically connected between each of the LED circuit 110 and the LED driver circuit 120, and are turned on or off according to the error detection signals O/S_1~O/S_4 corresponding to each of the LED circuit 110, thus controlling whether the first terminals $SRC_1'$~$SRC_4'$ of the LED circuits 110 receive the corresponding driving signals $SRC_1$~$SRC_4$.

The switch module circuit 130 is electrically connected to the LED driver circuit 120 and each of the LED circuits 110, so as to receive the required dimming signal PWM_data from the LED driver circuit 120 and transmit it to the second terminal SNK' of the LED circuits 110 that are electrically connected to each other. The switch module circuit 130 includes second switches $Q_5$~$Q_8$ and third switches $Q_9$~$Q_{12}$, where the second switches $Q_5$~$Q_8$ are used to receive the driving signals $SRC_1$~$SRC_4$ corresponding to the LED circuits 110, and the third switches $Q_9$~$Q_{12}$ are used to receive the error detection signals O/S_1~O/S_4 corresponding to the LED circuits 110.

When one of the LED circuits 110 is shorted or opened, its corresponding error detection signal O/S_x turns off the corresponding one of the first switches $Q_1$~$Q_4$ and the corresponding one of the third switches $Q_9$~$Q_{12}$, so that the first terminal $SRC_x'$ of this LED circuit 110 has a floating voltage and the second terminal SNK' of this LED circuit 110 cannot receive the corresponding dimming signal PWM_data. In this way, when one of the LED circuits 110 is shorted or opened, the backlight control circuit 100 of the present disclosure can enable other LED circuits 110 to receive normal dimming signal PWM_data even though their second terminals SNK' are mutually electrically connected, so that the brightness modulation of other LED circuits 110 is not affected.

Each of the LED circuits 110 includes one or more LEDs connected in series, and the first terminals $SRC_1'$~$SRC_4'$ of the LED circuits 110 are the anode terminals of the LEDs, and the second terminals SNK' of the LED circuits 110 are the cathode terminals of the LEDs. In the embodiment of the present disclosure, a display region formed by the LED circuits 110 is a common cathode connection architecture. In addition, FIG. 1 illustrates only four LED circuits 110, but there may be more or less LED circuits 110 as required, the corresponding driving signals $SRC_x$, error detection signals O/S_x, and dimming signal PWM_data are provided, and the present disclosure is not limited thereto.

The LED driver circuit 120 is electrically connected to the first switches $Q_1$~$Q_4$ and the switch module circuit 130, and is used to provide driving signals $SRC_1$~$SRC_4$, error detection signals O/S_1~O/S_4, and dimming signal PWM_data thereto. The LED driver circuit 120 provides the driving signals $SRC_1$~$SRC_4$ to the first terminals of the first switches $Q_1$~$Q_4$ and control terminals of the second switches $Q_5$~$Q_8$ at different times, so that the driving signals $SRC_1$~$SRC_4$ can be transmitted to the first terminals $SRC_1'$~$SRC_4'$ of the LED circuits 110 when the first switches $Q_1$~$Q_4$ are turned on and the second switches $Q_5$~$Q_8$ also can be sequentially turned on according to the driving signals $SRC_1$~$SRC_4$.

The LED driver circuit 120 provides dimming signal PWM_data to one terminal SNK of the switch module circuit 130, and transmits the corresponding dimming signal PWM_data to the second terminal SNK' of the LED circuit 110 through nodes $N_1$~$N_4$ when the switches in different columns of the switch module circuit 130 are turned on at different times. The LED driver circuit 120 is further used to provide the error detection signals O/S_1~O/S_4 to the control terminals of the first switches $Q_1$~$Q_4$ and the control terminals of the third switches $Q_9$~$Q_{12}$, such that the first switches $Q_1$~$Q_4$ and the third switches $Q_9$~$Q_{12}$ can be turned on or off according to the error detection signals O/S_1~O/S_4.

Specifically, when the LED circuit 110 is shorted or opened, the LED driver circuit 120 triggers its own internal short-circuit/open-circuit detection mechanism to cause state change (for example, the state is changed from logic 0 to logic 1 or from logic 1 to logic 0) of the error detection signals O/S_1~O/S_4, thus controlling the corresponding first switch (for example, at least one of the first switches $Q_1$~$Q_4$) and the third switch (for example, at least one of the third switches $Q_9$~$Q_{12}$) to be turned off. In this manner, the LED circuit 110 that is shorted or opened is prevented from receiving the driving signal and the dimming signal, without affecting other LED circuits 110. In some embodiments, the short circuit/open circuit detection mechanism may also be a detection circuit externally connected to the LED driver circuit 120, but the present disclosure is not limited thereto.

The switch module circuit 130 includes a plurality of columns of switches connected in parallel, and each column of switches include a second switch and a third switch connected in series. As shown in FIG. 1, the second switch $Q_5$ is connected in series with the third switch $Q_9$ to form a first switch column used for controlling the first one of the LED circuits 110; the second switch $Q_6$ is connected in series with the third switch $Q_{10}$ to form a second switch column used for controlling the second one of the LED circuits 110; the second switch $Q_7$ is connected in series with the third switch $Q_{11}$ to form a third switch column used for controlling the third one of the LED circuits 110; the second switch $Q_8$ is connected in series with the third switch $Q_{12}$ to form a fourth switch column for controlling the fourth one of the LED circuits 110.

In this embodiment, the number of the switch columns of the switch module circuit 130 depends on the number of the LED circuits 110. For example, if the number of the LED circuits 110 that require short-circuit or open-circuit detection is ten, the switch module circuit 130 has ten columns of switches, with one second switch in series connection with one third switch in each column. Thus, there will be a total of ten second switches and ten third switches in the switch module circuit 130.

Figure 2:
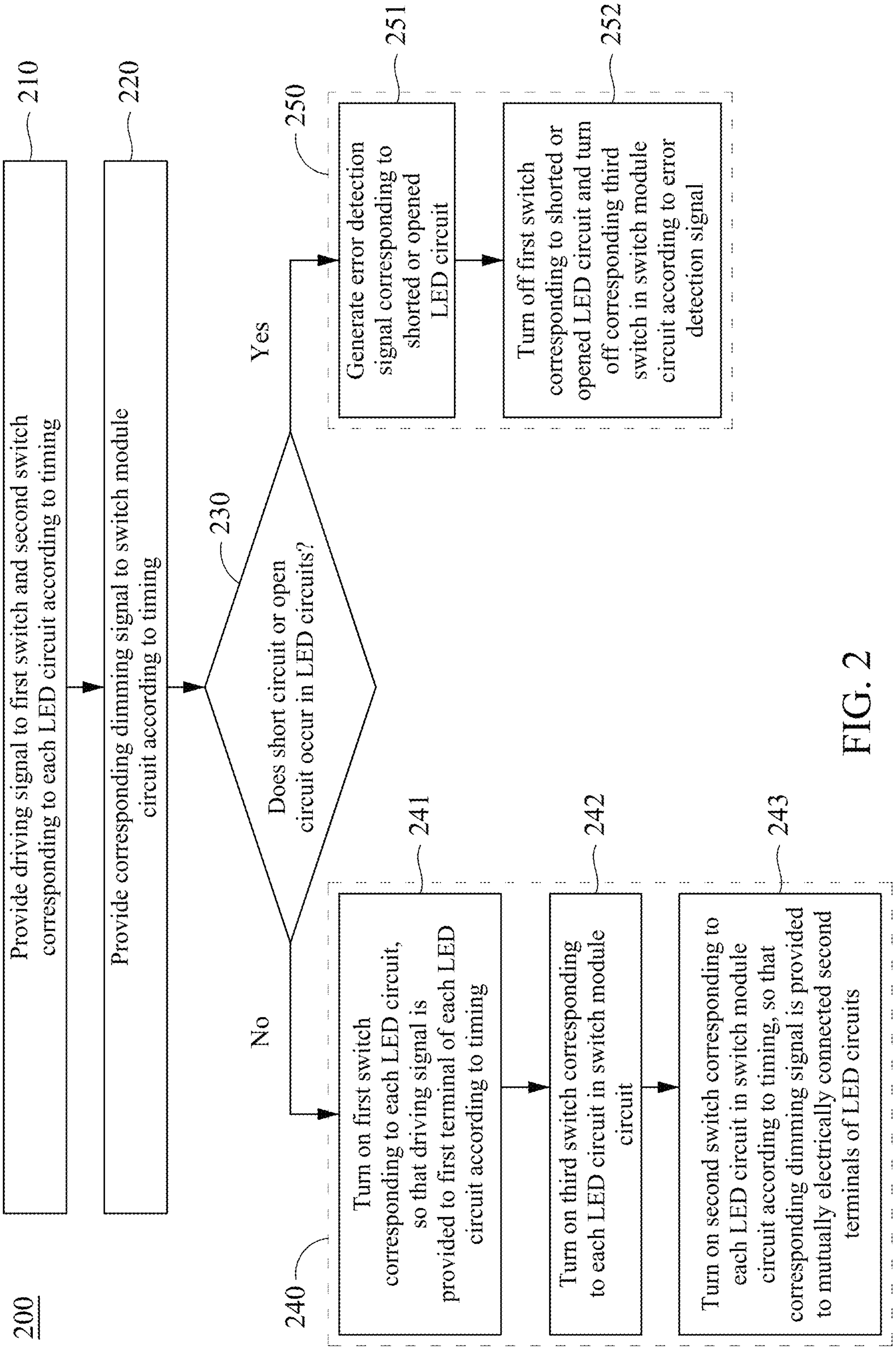
FIG. 2 is a schematic diagram of a driving method of a backlight control circuit according to an embodiment of the present disclosure.

Referring to FIG. 2, FIG. 2 is a schematic diagram of a driving method 200 of a backlight control circuit according to an embodiment of the present disclosure. The driving method 200 includes Steps 210 to 250, where Step 240 or 250 is selectively executed according to a determining result of Step 230. The driving method 200 of a backlight control circuit can be implemented by using the backlight control circuit 100 in FIG. 1 or architectures with similar functions, and the driving method 200 is described below with reference to the backlight control circuit 100 in FIG. 1.

In step 210, the LED driver circuit 120 provides driving signals $SRC_1$~$SRC_4$ to the first switches $Q_1$~$Q_4$ and the second switches $Q_5$~$Q_8$ of the LED circuits 110 according to timing, so that the first switches $Q_1$~$Q_4$ transmit the driving signals $SRC_1$~$SRC_4$ to the first terminals $SRC_1'$~$SRC_4'$ of the LED circuit 110 according to timing, and the second switches $Q_5$~$Q_8$ are turned on one by one according to the timing of the driving signals $SRC_1$~$SRC_4$.

In step 220, the LED driver circuit 120 provides the corresponding dimming signal PWM_data to one terminal SNK of the switch module circuit 130 according to the timing, and when there is no short circuit or open circuit in these LED circuits 110, the dimming signal PWM_data can be normally transmitted to the mutually electrically connected second terminal SNK' of the LED circuits 110 in sequence.

In step 230, the LED driver circuit 120 detects whether each of the LED circuits 110 is shorted or opened (for example, the first terminal SRCx' of a certain LED circuit 110 is shorted to the second terminal SNK', resulting in equal potential at the two terminals). When the LED driver circuit 120 detects that no LED circuit 110 is shorted or opened, step 240 of normally inputting the corresponding driving signals $SRC_1$~$SRC_4$ and dimming signal PWM_data to the LED circuits 110 according to the timing is performed.

When the LED driver circuit 120 detects that one or more of the LED circuits 110 are shorted or opened, step 250 of using a control mode in the case of a short circuit or open circuit is performed. It should be understood that steps 210 to 230 are not performed necessarily in a certain order, and in fact the steps can be interchanged or varied. For example, step 220 may be first performed and then step 210 is performed, or the three steps are performed at the same time. Moreover, by performing Step 230, the open-circuit or short-circuit situation of each of the LED circuits 110 can be detected throughout the whole process in real-time, but the present disclosure is not limited thereto.

When the LED driver circuit 120 detects that no LED circuit 110 is shorted or opened, step 240 is performed. In step 240, first, sub-step 241 of turning on the first switch $Q_1$~$Q_4$ corresponding to the LED circuits 110 according to the error detection signal O/S_1~O/S_4 is performed, so that the driving signals $SRC_1$~$SRC_4$ can be transmitted to the first terminals SRC1'~SRC4' of the LED circuits 110 according to the timing. Specifically, because the LED driver circuit 120 detects that no LED circuit 110 is shorted or opened, the error detection signals O/S_1~O/S_4 are not triggered to turn off the first switches $Q_1$~$Q_4$ and thus the first switches $Q_1$~$Q_4$ remain on; and the driving signals $SRC_1$~$SRC_4$ are transmitted to the first terminals SRC1'~SRC4' of the LED circuits 110 according to the timing.

In sub-step 242, the LED driver circuit 120 turns on the third switches $Q_9$~$Q_{12}$ corresponding to each of the LED circuits 110 in the switch module circuit 130 according to the error detection signals O/S_1~O/S_4. Specifically, because the LED driver circuit 120 detects that no LED circuit 110 is shorted or opened, the error detection signals O/S_1~O/S_4 are not triggered to turn off the third switches $Q_9$~$Q_{12}$, and thus the third switches $Q_9$~$Q_{12}$ remain on.

In sub-step 243, because the first switches $Q_1$~$Q_4$ and the third switches $Q_9$~$Q_{12}$ are in the turned-on state, the first terminals $SRC_1$'~$SRC_4$' of the LED circuits 110 and the control terminals of the second switches $Q_5$~$Q_8$ are able to sequentially receive the driving signals $SRC_1$~$SRC_4$ provided by the LED driver circuit 120, so that the LED circuits 110 are sequentially driven and sequentially receive the required dimming signal PWM_data, thereby driving the LEDs in the LED circuit 110 to display corresponding brightness.

Figure 3:
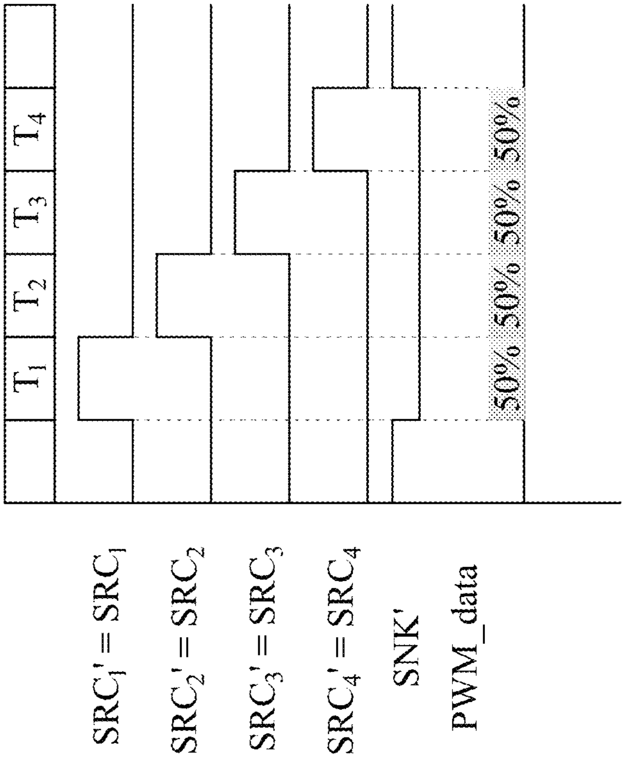
FIG. 3 is a schematic timing diagram of the driving method during normal operation of LED circuits according to an embodiment of the present disclosure.

Referring to FIG. 3, FIG. 3 is a schematic timing diagram of the driving method 200 during normal operation of the LED circuits 110 according to an embodiment of the present disclosure. As shown in FIGS. 1 and 3, the LED driver circuit 120 provides the driving signals $SRC_1$~$SRC_4$ at different times according to the timing $T_1$~$T_4$. Because there is no short circuit or open circuit in each LED circuit 110, the first switches $Q_1$~$Q_4$ and the third switches $Q_9$~$Q_{12}$ remain a normal on-state, so that the first terminals $SRC_1$'~$SRC_4$' of the LED circuits 110 receive the driving signals $SRC_1$~$SRC_4$ (i.e., $SRC_1$'~$SRC_4$'=$SRC_1$~$SRC_4$). The second switches $Q_5$~$Q_8$ are sequentially turned on according to the driving signals $SRC_1$~$SRC_4$, such that the second terminal SNK' of the LED circuits 110 can receive the dimming signal PWM_data input from the nodes $N_1$~$N_4$ according to the timing $T_1$~$T_4$.

Therefore, each of the LED circuit 110 is able to display corresponding brightness according to the driving signal and the dimming signal at corresponding timing. It should be understood that setting the dimming signal PWM_data of each LED circuit 110 in the drawing to 50% of dimming cycle is only an example, and in fact, the dimming signal PWM_data can be adjusted to different dimming cycles as required, so that the LED circuits 110 display the required brightness according to the dimming signal PWM_data. However, the present disclosure is not limited thereto.

The process goes back to step 230 of FIG. 2, in which step 250 is performed when the LED driver circuit 120 detects that there is an LED circuit 110 that has a short circuit or an open circuit. Step 250 includes sub-steps 251 and 252. According to an error detection signal O/S_x output by the LED driver circuit 120 when detecting a short or open circuit in an LED circuit 110, the first switch and the third switch corresponding to this LED circuit 110 are turned off. Therefore, the first terminal $SRC_x$' of this LED circuit 110 cannot receive the driving signal $SRC_x$ (that is, the potential of the first terminal $SRC_x$' is a floating voltage), and the second terminal SNK' of this LED circuit 110 also cannot receive the corresponding dimming signal PWM_data during the corresponding timing. In this way, the shorted or opened LED circuit 110 may be independently turned off, so that other LED circuits 110 can also receive normal dimming signals PWM_data even though the second terminals SNK' are mutually electrically connected.

Figure 4:
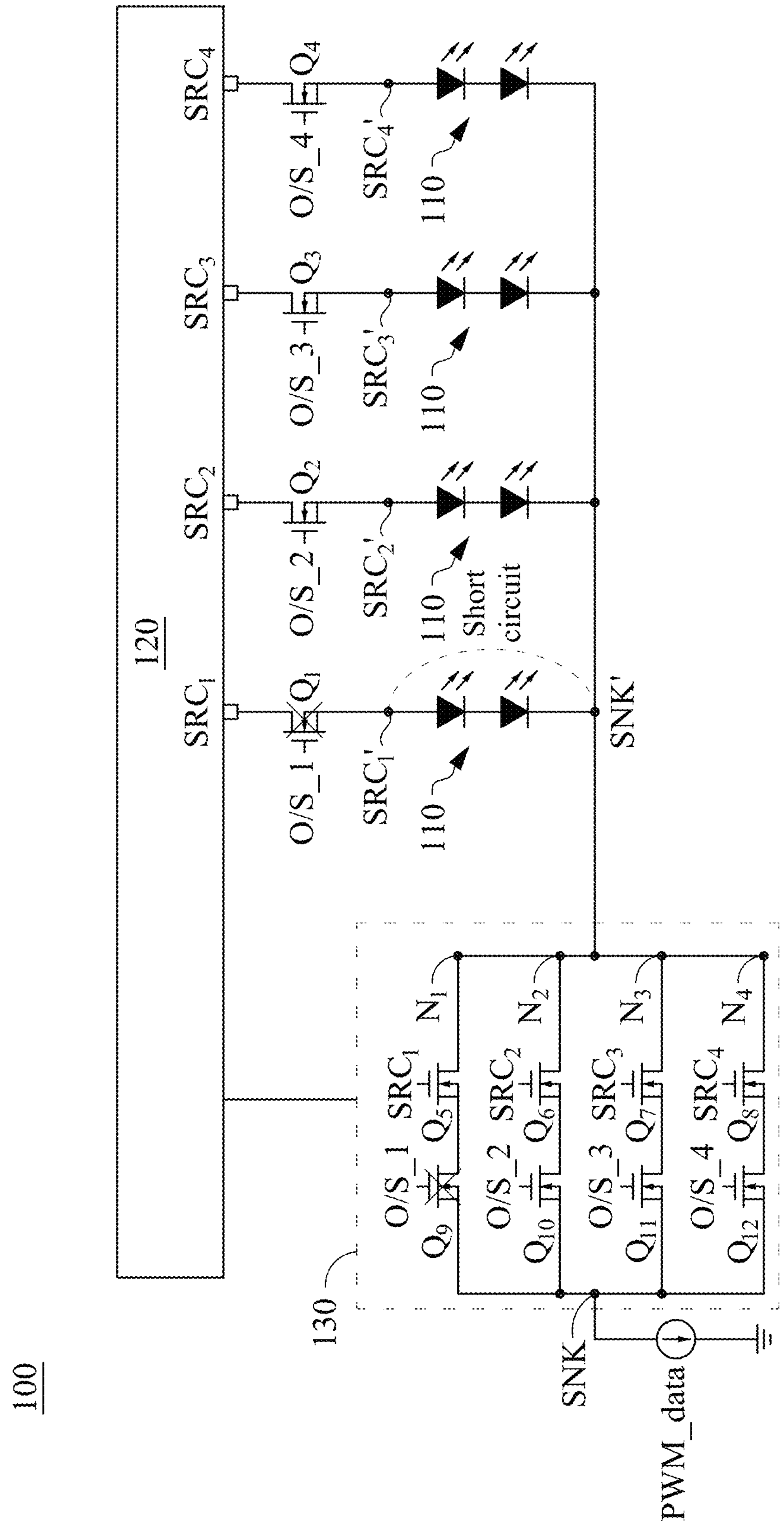
FIG. 4 is a schematic circuit diagram in a control mode of the driving method in the case of a short circuit or open circuit according to an embodiment of the present disclosure.
Figure 5:
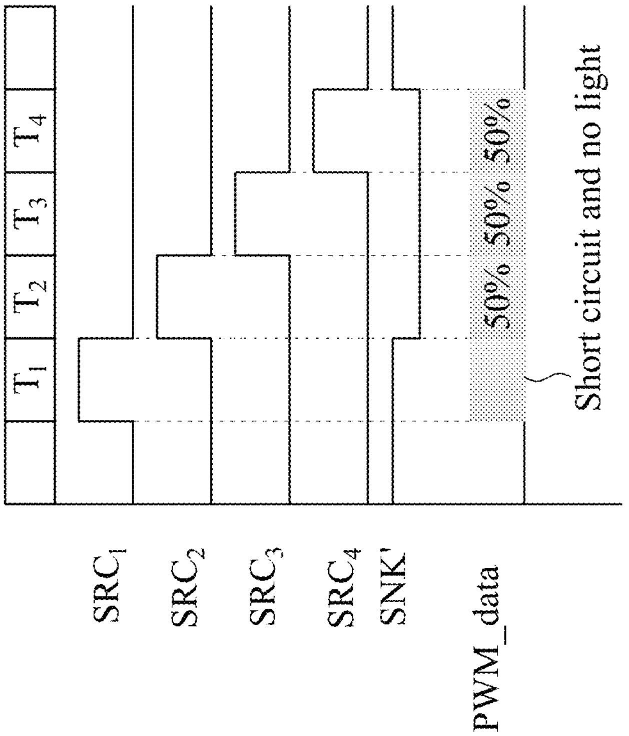
FIG. 5 is a schematic timing diagram in a control mode of the driving method in the case of a short circuit or open circuit according to an embodiment of the present disclosure.

Referring to FIGS. 4 and 5 together, FIGS. 4 and 5 are respectively a schematic circuit diagram and a schematic timing diagram in a control mode of the driving method 200 in the case of a short circuit or open circuit according to an embodiment of the present disclosure. In the backlight control circuit 100 of FIG. 4, a short circuit occurs in the first one of the LED circuits 110 such that the potential of the first terminal $SRC_1$' of this LED circuit 110 is equal to the potential of the second terminal SNK'. In this case, the LED driver circuit 120 detects the short circuit in the first one of the LED circuits 110 and generates an error detection signal O/S_1 to the control terminals of the first switch $Q_1$ and the third switch $Q_9$, so as to turn off the first switch $Q_1$ and the third switch $Q_9$ (FIG. 4 shows turn-off of the first switch $Q_1$ and the third switch $Q_9$ with the symbol X).

In this case, even if the second switch $Q_5$ is turned on by receiving the driving signal $SRC_1$, the corresponding dimming signal PWM_data also cannot be transmitted to the second terminals SNK' of the LED circuits 110 that are electrically connected to each other. Moreover, the first terminal $SRC_1$' of the LED circuit 110 also cannot receive the driving signal $SRC_1$ due to turn-off of the first switch $Q_1$, and presents a floating state. In other words, because the first terminal $SRC_1$' of the first one of the LED circuits 110 is in the floating state, the potential of the second terminal SNK' is unlikely to be pulled to the same level as that of the driving signal $SRC_1$ due to the short circuit. Thus, in other periods of timing, the potential of the second terminal SNK' will not follow the ground potential of the driving signal $SRC_1$, so the dimming of other LED circuits still can be achieved.

As shown by the timing diagram of FIG. 5, when a short circuit occurs in the first one of the LED circuits 110, the LED driver circuit 120 may still provide the driving signals $SRC_1$~$SRC_4$ according to the timing $T_1$~$T_4$, and triggers the error detection signal O/S_1 based on the detection result to turn off the first switch $Q_1$ and the third switch $Q_9$. The turn-off of the first switch $Q_1$ blocks the first terminal $SRC_1'$ of the first one of the LED circuits 110 from receiving the driving signal $SRC_1$ (in the floating state), and the turn-off of the third switch $Q_9$ blocks the second terminal SNK' of the first one of the LED circuits 110 from receiving the corresponding dimming signal PWM_data at the timing $T_1$.

In this case, even if the first terminal $SRC_1'$ of the first one of the LED circuits 110 and the second terminals SNK' of the LED circuits 110 are equal due to a short circuit therebetween (i.e., SNK'=$SRC_1'$=floating potential during the timing $T_1$), other LED circuits 110 are not affected during other periods of timing $T_2$~$T_3$, only the first one of the LED circuits 110 fails to receive the driving voltage $SRC_1$ and the corresponding dimming signal PWM_data during the period of timing $T_1$. In other words, the second terminals SNK' of the LED circuits 110 that are electrically connected to each other are unlikely to be electrically connected to the ground potential with the driving signal $SRC_1$ during other periods of timing $T_2$~$T_3$ due to the short circuit in the first one of the LED circuits 110, thus not affecting other LED circuits 110 to receive the corresponding dimming signal PWM_data.

It should be understood that other LED circuits 110 receiving the dimming signals PWM_data with 50% dimming cycle in their respective periods of timing $T_2$~$T_3$ is only an example, and in fact, the dimming signal PWM_data can be adjusted to different dimming cycles as required, so that the LED circuits 110 display the required brightness according to the dimming signal PWM_data.

Figure 6:
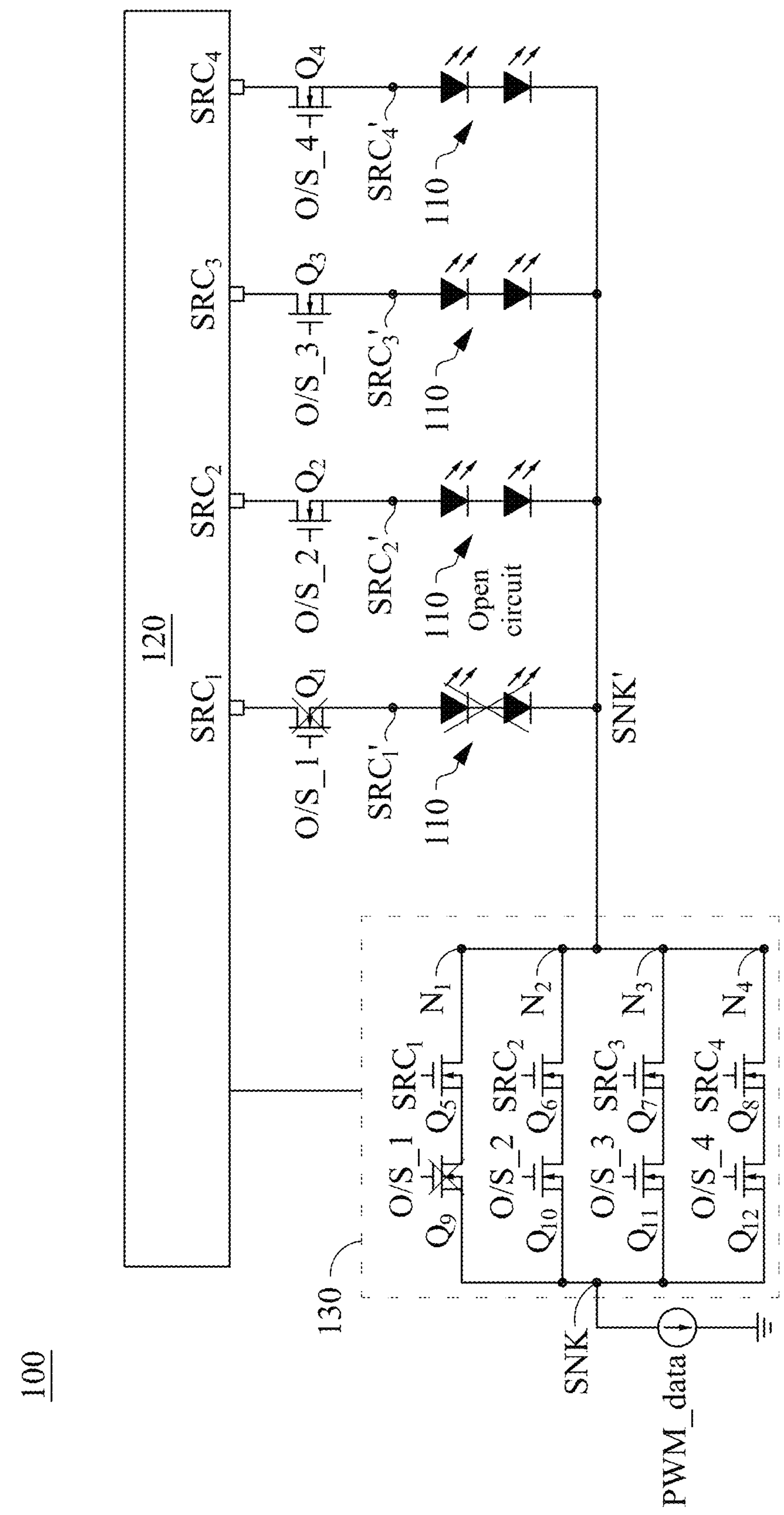
FIG. 6 is a schematic circuit diagram in a control mode of the driving method in the case of a short circuit or open circuit according to an embodiment of the present disclosure.
Figure 7:
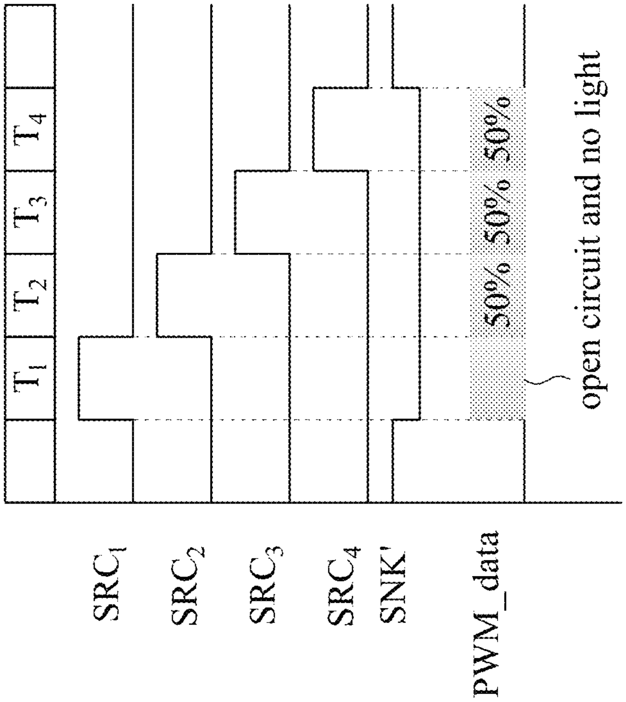
FIG. 7 is a schematic timing diagram in a control mode of the driving method in the case of a short circuit or open circuit according to an embodiment of the present disclosure.

Referring to FIGS. 6 and 7 together, FIGS. 6 and 7 are respectively a schematic circuit diagram and a schematic timing diagram in a control mode of the driving method 200 in the case of a short circuit or open circuit according to an embodiment of the present disclosure. In the backlight control circuit 100 of FIG. 6, an open circuit occurs in the first one of the LED circuits 110. In this case, the LED driver circuit 120 detects that the first one of the LED circuits 110 is opened and then generates an error detection signal O/S_1 to the control terminals of the first switch $Q_1$ and the third switch $Q_9$, so as to turn off the first switch $Q_1$ and the third switch $Q_9$ (FIG. 6 shows turn-off of the first switch $Q_1$ and the third switch $Q_9$ with the symbol X).

In this case, even if the second switch $Q_5$ is turned on by receiving the driving signal $SRC_1$, the corresponding dimming signal PWM_data also cannot be transmitted to the second terminals SNK' of the LED circuits 110 that are electrically connected to each other. Moreover, the first terminal $SRC_1'$ of the LED circuit 110 also cannot receive the driving signal $SRC_1$ due to the turn-off of the first switch $Q_1$, and presents a floating state.

As shown by the timing diagram of FIG. 7, when an open circuit occurs in the first one of the LED circuits 110, the LED driver circuit 120 may still provide the driving signals $SRC_1$~$SRC_4$ according to the timing $T_1$~$T_4$, and triggers the error detection signal O/S_1 based on the detection result to turn off the first switch Q1 and the third switch $Q_9$. Therefore, during the period of timing $T_1$, the node $N_1$ of the switch module circuit 130, the second terminal SNK' of the LED circuit 110, and the first terminal $SRC_1'$ of the first one of the LED circuits 110 all present the floating state.

Specifically, the turn-off of the first switch $Q_1$ blocks the first terminal $SRC_1'$ of the first one of the LED circuits 110 from receiving the driving voltage $SRC_1$ (in the floating state), and the turn-off of the third switch $Q_9$ blocks the second terminals SNK' of the LED circuits 110 from receiving the corresponding dimming signal PWM_data through the node $N_1$, thus preventing other LED circuits 110 from being affected in other periods of timing $T_2$~$T_3$.

It should be understood that other LED circuits 110 receiving the dimming signal PWM_data with 50% dimming cycle in their respective periods of timing $T_2$~$T_3$ is only an example, and in fact, the dimming signal PWM_data can be adjusted to different dimming cycles as required, so that the LED circuits 110 display the required brightness according to the dimming signal PWM_data.

According to the backlight control module and its driving method of the present disclosure, by controlling the first switches electrically connected to the anode terminals of the LED circuits and the switch module circuit electrically connected to the common cathode terminals of the LED circuits, in the event of a short circuit or open circuit in at least one LED circuit, the light-emitting behavior of other LED circuits in the same column will not be affected in spite of mutual connection of the cathodes of the LED circuits. In this case, other LED circuits can still receive normal dimming signal according to the timing, thus implementing brightness adjustment.

The present disclosure has been disclosed above by preferred embodiments, and is not intended to limit the present disclosure. Any person with ordinary skill in the art can make some changes or modifications without departing from the spirit and scope of the present disclosure. Therefore, the protection scope of the present disclosure shall be subject to the scope defined by the appended claims.

What is claimed is:

1. A backlight control circuit, comprising:

a plurality of light emitting diode (LED) circuits, corresponding to a plurality of dimming zones in a one-to-one manner, wherein each of the LED circuits comprises a first terminal and a second terminal and the second terminal of each of the LED circuits are electrically connected to each other;

an LED driver circuit, used to provide a driving signal and a corresponding dimming signal to each of the LED circuits according to timing, wherein when one of the LED circuits is shorted or opened, the LED driver circuit is further used to provide a corresponding error detection signal to each of the LED circuits;

a plurality of first switches, electrically connected to the LED circuits and the LED driver circuit, wherein the first switches are separately electrically connected to the first terminal of each of the LED circuits, so as to switch on or off each of the LED circuits according to the corresponding error detection signal corresponding to each of the LED circuits; and a switch module circuit, electrically connected to the LED driver circuit and the second terminal of each of the LED circuits, so as to provide the corresponding dimming signal to each of the LED circuits, wherein the switch module circuit comprises:

a plurality of second switches, separately used to receive the driving signal corresponding to each of the LED circuits so as to independently provide the corresponding dimming signal to each of the LED circuits at different times; and a plurality of third switches, separately connected in series with a corresponding one of the second switches and used to receive the corresponding error detection signal corresponding to each of the LED circuits;

wherein when one of the LED circuits is shorted or opened, the corresponding error detection signal turns off the corresponding one of the first switches and the corresponding one of the third switches, so that the first terminal of the shorted or opened LED circuit has a floating voltage, the second terminal of the shorted or opened LED circuit is unable to receive the corresponding dimming signal, and other LED circuits with mutually connected second terminal receive the corresponding dimming signal.

2. The backlight control circuit of claim 1, wherein each of the LED circuits comprises at least one LED.

3. The backlight control circuit of claim 2, wherein the first terminal of each of the LED circuits is an anode terminal of the at least one LED.

4. The backlight control circuit of claim 2, wherein the second terminal of each of the LED circuits is a cathode terminal of the at least one LED.

5. The backlight control circuit of claim 1, wherein the number of the second switches in the switch module circuit are equal to the number of the LED circuits.

6. The backlight control circuit of claim 1, wherein the number of the third switches in the switch module circuit are equal to the number of the LED circuits.

7. The backlight control circuit of claim 1, wherein when none of the LED circuits is shorted or opened, the first switches and the third switches corresponding to each of the LED circuits are normally turned on.

8. The backlight control circuit of claim 1, wherein each of the first switches comprises a control terminal, a first terminal and a second terminal, the control terminal is configured to receive the corresponding error detection signal, the first terminal is electrically connected to the LED driver circuit, the second terminal is electrically connected to the first terminal of corresponding one of the LED circuits.

9. The backlight control circuit of claim 1, wherein each of the second switches comprises a control terminal, a first terminal and a second terminal, the control terminal is configured to receive the driving signal, the first terminal is electrically connected to corresponding one of the third switches, the second terminal is electrically connected to the second terminal of the LED circuits.

10. The backlight control circuit of claim 9, wherein each of the third switches comprises a control terminal, a first terminal and a second terminal, the control terminal is configured to receive the corresponding error detection signal, the first terminal is configured to receive the corresponding dimming signal, the second terminal is electrically connected to the first terminal of corresponding one of the second switches.

11. A driving method of a backlight control circuit, comprising:

providing a driving signal to a first switch corresponding to each of a plurality of light emitting diode (LED) circuits according to timing;

providing a corresponding dimming signal to a second terminal of the LED circuits via a plurality of second switches in a switch module circuit according to the timing; and when at least one of the LED circuits is shorted or opened, performing the following steps:

generating an error detection signal corresponding to the at least one of the LED circuits; and turning off the first switch corresponding to the at least one of the LED circuits and turning off a third switch corresponding to the at least one of the LED circuits in the switch module circuit according to the error detection signal;

wherein after the first switch and the third switch corresponding to the at least one of the LED circuits are turned off, a first terminal of the at least one of the LED circuits has a floating voltage, the second terminal of the LED circuits is unable to receive the corresponding dimming signal, and other LED circuits with the second terminal receives the corresponding dimming signal in other periods of the timing.

12. The driving method of claim 11, wherein each of the LED circuits comprises at least one LED.

13. The driving method of claim 12, wherein the first terminal of each of the LED circuits is an anode terminal of the at least one LED.

14. The driving method of claim 12, wherein the second terminal of each of the LED circuits is a cathode terminal of the at least one LED.

15. The driving method of claim 11, further comprising:

when the LED circuits are normally sequentially driven, performing following steps:

turning on the first switch corresponding to each of the LED circuits, so that the driving signal is provided to the first terminal of each of the LED circuits according to the timing;

turning on the third switch corresponding to each of the LED circuits in the switch module circuit; and turning on a second switch corresponding to each of the LED circuits in the switch module circuit according to the timing, so that the corresponding dimming signal are provided to the second terminal of each of the LED circuits.

16. The driving method of claim 11, wherein the number of the second switches in the switch module circuit are equal to the number of the LED circuits.

17. The driving method of claim 11, wherein the number of the third switches in the switch module circuit are equal to the number of the LED circuits.

18. The driving method of claim 11, wherein each of the first switches comprises a control terminal, a first terminal and a second terminal, the control terminal is configured to receive corresponding one of the error detection signal, the first terminal is electrically connected to a LED driver circuit, the second terminal is electrically connected to the first terminal of corresponding one of the LED circuits.

19. The driving method of claim 11, wherein each of the second switches comprises a control terminal, a first terminal and a second terminal, the control terminal is configured to receive the driving signal, the first terminal is electrically connected to corresponding one of the third switches, the second terminal is electrically connected to the second terminal of the LED circuits.

20. The driving method of claim 19, wherein each of the third switches comprises a control terminal, a first terminal and a second terminal, the control terminal is configured to receive corresponding one of the error detection signal, the first terminal is configured to receive the corresponding dimming signal, the second terminal is electrically connected to the first terminal of corresponding one of the second switches.

* * * * *